(12) United States Patent
Adent et al.

(10) Patent No.: US 7,972,055 B2
(45) Date of Patent: Jul. 5, 2011

(54) METHOD AND SYSTEM FOR ADMINISTERING MICRO-INGREDIENT FEED ADDITIVES TO ANIMAL FEED RATIONS INCLUDING CONTROLLED BIN ACCESS

(75) Inventors: John E. Adent, Fort Collins, CO (US); Steve R. Freeman, Windsor, CO (US)

(73) Assignee: Lextron, Inc., Greeley, CO (US)

( * ) Notice: Subject to any disclaimer, the term of this patent is extended or adjusted under 35 U.S.C. 154(b) by 72 days.

(21) Appl. No.: 12/566,537

(22) Filed: Sep. 24, 2009

(65) Prior Publication Data

US 2010/0017024 A1 Jan. 21, 2010

Related U.S. Application Data

(62) Division of application No. 11/422,168, filed on Jun. 5, 2006, now Pat. No. 7,744,269.

(51) Int. Cl.
*B01F 15/02* (2006.01)

(52) U.S. Cl. ............ 366/142; 366/150.1; 366/177.1; 366/347

(58) Field of Classification Search .............. 221/1, 10, 221/11, 14; 70/57.1, 262, 263; 700/215, 700/219, 237, 221, 226; 366/150.1, 142, 366/177.1, 347
See application file for complete search history.

(56) References Cited

U.S. PATENT DOCUMENTS

| | | | |
|---|---|---|---|
| 4,733,971 A | 3/1988 | Pratt | |
| 4,815,042 A | 3/1989 | Pratt | |
| 4,889,443 A | 12/1989 | Billings | |
| 5,158,347 A | 10/1992 | Warren et al. | |
| 5,219,224 A | 6/1993 | Pratt | |
| 5,487,603 A | 1/1996 | Hoff et al. | |
| 5,957,372 A | 9/1999 | Dean et al. | |
| 5,964,374 A * | 10/1999 | Yuyama et al. | 221/17 |
| 6,108,588 A | 8/2000 | McGrady | |
| 6,847,861 B2 | 1/2005 | Lunak et al. | |
| 2002/0032582 A1 | 3/2002 | Feeney et al. | |
| 2007/0280041 A1 | 12/2007 | Adent et al. | |

OTHER PUBLICATIONS

Bass Home Electronics Website Home Page, Securitron Cabinet Locks, Securitron SCL-24: Solenoid Cabinet Lock 24 Volts DC, 3 pages, printed Apr. 18, 2006.
Bass Home Electronics Website Home Page, Bioscrypt: Bioscrypt Fingerprint Readers, 5 pages, printed Apr. 18, 2006.
Notice of Allowability for U.S. Appl. No. 11/422,168, mailed Mar. 10, 2010, 4 pgs.
Official Action for U.S. Appl. No. 11/422,168, mailed Dec. 21, 2009, 4 pages.

\* cited by examiner

*Primary Examiner* — Tony G Soohoo
(74) *Attorney, Agent, or Firm* — Sheridan Ross, P.C.

(57) ABSTRACT

A method and system are provided for administering micro-ingredient feed additives wherein controlled access is provided to the bins or containers that store the micro-ingredients prior to delivery thereby preventing inadvertent errors in adding incorrect micro-ingredients to a feed ration as well as to provide a measure of security to prevent tampering with the micro-ingredients in the bins. A micro-ingredient delivery system typically includes a plurality of bins that store designated micro-ingredients therein. Each bin may have a locking device thereby restricting access to the bin, along with a switch indicating whether the bin access cover is open or closed. A master controller of the delivery system provides signals to lock or unlock the locking devices based upon authorizations provided to access the bins in accordance with the particular operating parameters and requirements of the delivery system.

10 Claims, 2 Drawing Sheets

METHOD AND SYSTEM FOR ADMINISTERING MICRO-INGREDIENT FEED ADDITIVES TO ANIMAL FEED RATIONS INCLUDING CONTROLLED BIN ACCESS

CROSS REFERENCE TO RELATED APPLICATION

This application is a divisional application of U.S. application Ser. No. 11/422,168, filed on Jun. 5, 2006, , now U.S. Pat. No. 7,744,269 entitled "METHOD AND SYSTEM FOR ADMINISTERING MICRO-INGREDIENT FEED ADDITIVES TO ANIMAL FEED RATIONS INCLUDING CONTROLLED BIN ACCESS", the disclosures of both applications being hereby incorporated by reference herein in their entirety.

FIELD OF THE INVENTION

The present invention relates to micro-ingredients added to feed rations for animals such as livestock, and more particularly, to a method and system for administering micro-ingredient feed additives wherein controlled access is provided to the bins or containers that store the micro-ingredients prior to delivery thereby preventing inadvertent errors in adding incorrect micro-ingredients to a feed ration as well as to provide a measure of security to prevent tampering with the micro-ingredients.

BACKGROUND OF THE INVENTION

Providing animals with various dietary supplements and medications such as vitamins, mineral, enzymes, hormones, and antibiotics is a common and well-known practice in the livestock and poultry industries. The manner in which these supplements are combined with a consumptive fluid carrier such as water is disclosed in a number of patents to include the U.S. Pat. Nos. 4,889,443; 4,815,042; 4,733,971; 5,219,224; and 5,487,603. In these references as well as many others, it is known to utilize automated systems which dispense discrete amounts of micro-ingredients, combine the micro-ingredients, and then deliver the micro-ingredients to a feed ration, typically in a slurry mixture. These micro-ingredients are typically added to the animal feed rations using mixing or spraying methods. Some animal feed supplements include pharmaceuticals. Mixing these pharmaceuticals with animal feed causes them to be subject to the regulations of the Food and Drug Administration (FDA). Accordingly, the locations that produce these medicated feed rations must maintain compliance with FDA regulations. Such locations may be routinely inspected by FDA personal, and are subject to various reporting requirements. Therefore, it is imperative that equipment used in the processes is capable of accurately and precisely metering, dispensing, and mixing quantities of the micro-ingredients.

One focus for most of the prior references that disclose equipment used for dispensing and mixing micro-ingredients is to improve accuracy and precision in delivering the micro-ingredients. Over time, great improvements have been made in providing reliable systems for delivering micro-ingredients.

The most common method for measuring the amount of a micro-ingredient to be used in a designated ration is use of one or more weigh scales that weigh the amount of each micro-ingredient delivered to the ration. The weight measurement may be achieved in various methods such as measurement of loss in weight or measurement of gain in weight. Loss in weight refers to measuring the weigh loss of a particular bin that has dispensed the micro-ingredient, the loss in weight corresponding to the amount of the micro-ingredient dispensed from the bin. Gain in weight refers to measuring the amount of a micro-ingredient delivered to a receiving container, the increase in weight corresponding to the amount of the micro-ingredient delivered to the receiving container. Another common method of measuring the amount of a micro-ingredient that has been dispensed is measurement by volume. It is known that certain delivery mechanisms such as an auger have the capability to accurately and precisely dispense a known quantity of a micro-ingredient over a period of time. Thus, measurement of a delivered micro-ingredient can be determined on a volumetric basis wherein an amount delivered is determined by the length of time that the delivery mechanism is activated. Volume measurement is particularly useful with respect to measurement of liquid micro-ingredients.

Despite the accuracy and precision of the machines that deliver the micro-ingredients, and despite the improved computer processing equipment that may be used to calculate required amounts and to record deliveries to designated feed batches, errors can still be made in delivering the micro-ingredients to the designated feed ration. One type of error that can occur despite the above-mentioned improvements is the simple failure to load the designated storage bin with the correct micro-ingredient. For each micro-ingredient used in an automated micro-ingredient delivery system, each bin must be pre-designated to hold a specified micro-ingredient so that the correct types and amounts of the micro-ingredient are dispensed once the automated delivery sequence begins. The micro-ingredient bins and the delivery devices connected thereto, such as augers and pumps, do not have the inherent capability to distinguish between loaded micro-ingredients. Rather, the bins are simply sized to hold a designated quantity of whatever ingredient is loaded therein, and the delivery devices operate to dispense designated amounts of the ingredients from the bins as instructed by commands generated from a controller. The commands may be based on a timed delivery, or based on loss in weight or gain in weight methods.

One object of the present invention is to provide controlled access to the bins that hold the micro-ingredients prior to delivery Another object of the present invention is to provide a micro-ingredient delivery system and method wherein controlled access is provided through the controller and wherein an appropriate remedial action can be specified by the controller in response to a particular alarm condition or system malfunction.

Another object of the invention is to provide a reliable yet cost effective solution for controlled access to the bins.

It is yet another object of the present invention to provide a micro-ingredient delivery system whereby accurate records may be kept to comply with required governmental regulations to include recordation of the types and amounts of micro-ingredients loaded in each different bin of the system and ultimately delivered to the designated feed rations.

In all of the foregoing objects, a micro-ingredient delivery system and method is provided that still provides an accurate and precise means of delivering the micro-ingredients, yet the system is made even more reliable by providing controlled access to the bins that store the micro-ingredients.

SUMMARY OF THE INVENTION

In accordance with the present invention, a method and system are provided for administering micro-ingredient feed additives to animal feed rations wherein access to the micro-ingredients is controlled by use of bins that each have integral locking mechanisms that are controlled as system components by the system controller. In a typical micro-ingredient system, a number of bins are provided that hold both liquid and dry micro-ingredients. Some type of access is provided to the interior of each bin, such as a cover or lid that enables micro-ingredients to be added to the bin. A delivery device is associated with each bin in order to dispense the micro-ingredient from the bin to another container, such as a common receiving container that allows the ingredients to be conveyed as a group to the designated feed ration. The bins are periodically loaded with micro-ingredients to satisfy the daily feed calls. System operators must therefore charge each bin with the correct micro-ingredient to ensure that the correct micro-ingredient is added to the designated feed ration. There are two primary types of errors that can occur in adding micro-ingredients to the respective bins. The first type of error is adding a particular micro-ingredient to a bin, and that micro-ingredient is not specified in the feed ration to be prepared. The other type of error is the micro-ingredient specified for a particular feed ration is added to the incorrect bin. Either of these errors will result in the incorrect mix of micro-ingredients delivered to a feed ration. The bins and dispensing devices do not have any inherent means in which to confirm the identity of the micro-ingredients loaded in the bins. Accordingly, ensuring that the correct ingredients are added to the designated bins is entirely dependent upon the operator correctly charging each of the bins. Over time, bins may be designated to hold different types of micro-ingredients, since batch requirements for different feed rations will change over time.

To provide controlled access to the bins and to thereby prevent the wrong micro-ingredients from being placed in the wrong bins, a locking device/mechanism is placed on the opening access to each bin. The locking devices are linked to the controller that controls the automatic dispensing of the micro-ingredients. The controller provides signals to place the locking devices in either a locked or unlocked position. In the locked position, access to the bins is prevented. In the unlocked position, an operator may remove the access cover or panel that is used to gain access to the bin. A contact switch may also be incorporated on the bins to indicate whether the cover of the bin has been removed, it being understood that depending on the type of locking device used, a signal indicating that the lock is in a particular position may not indicate whether an access cover has actually been removed from the bin.

The controller used to control access to the bins is preferably the same master controller that is used to control basic functioning of the automated micro-ingredient delivery system. One typical arrangement of the master controller in a micro-ingredient delivery system comprises a programmable logic controller (PLC) with input/output modules that send controlling signals to the mechanical/electrical devices in the delivery system, and also receive input signals from these devices as the automated delivery sequences are conducted. The PLC may also be supplemented with a standard personal computer that interfaces with the PLC and an external animal management system. The computer sends mixing or batching instructions to the PLC. The computer receives information from the external animal management system to include instructions as to which feed rations should be prepared for a designated facility.

In addition to the controller used in the micro-ingredient delivery system, a separate access control can be provided solely for allowing maintenance personnel or operators to access the bins storing the micro-ingredients. There may be limited times during which access can be made to the bins during operation of micro-ingredient delivery system. For example, a delivery system may not be available for maintenance during normal working hours, and it may be necessary for maintenance personnel to conduct maintenance on the bins or to otherwise address a problem that has arisen with regard to the bins or the delivery devices connected to the bins. In such cases, it is advantageous to provide a separate access control feature for sole purposes of providing access to the bins without having to gain access through the master controller. By use of this separate access control device, authorization can be provided to selected maintenance or other personnel without compromising overall system security.

Prior to delivering the micro-ingredients from the bins for a particular batch of feed, it may be necessary to charge a bin with a micro-ingredient such that there is enough of the micro-ingredient within the bin to satisfy the next scheduled batch. In order to confirm that the correct micro-ingredient is to be added to the designated bin, the micro-ingredient must first be authenticated. To achieve authentication, a barcode device is incorporated in the micro-ingredient delivery system. The bar code device communicates with the master controller, and a barcode scanner of the bar code device is used to scan barcode information on the packages of the micro-ingredients that are intended to be added to the bins. When the barcode on the micro-ingredient package is scanned, a command from the controller can be generated to unlock the lock located on the cover of the bin that stores the corresponding micro-ingredient, thereby allowing the micro-ingredient to be added to the bin. If the bar code information does not match an approved ingredient for the designated batch of feed ration, the controller can maintain the lock in the locked position, and can then generate an appropriate error message such as a user-interface message indicating the nature of the problem. In the memory of the controller, one or more databases can reside which contain a wide array of information on the micro-ingredients to be used for each type of feed ration, and the micro ingredients actually used in preparation of each batch of feed ration. Such information may include manufacturers, lot numbers, and any other information that is incorporated in the barcode scheme. When the micro-ingredient has been added to the designated bin, a further check can be made to ensure that the micro-ingredient scanned corresponds to the micro-ingredient actually placed in the open bin. One way to conduct this additional check is to confirm the weight that has been added to the bin from the contents of the scanned package of micro-ingredient. The bar code information typically includes the weight of the package. A weight comparison can be made to ensure that the weight added to the bin matches the same weight as the amount of the scanned micro-ingredient removed from the package. If the entire package or bag of the micro-ingredient is used, a simple comparison can be made of the listed package weight with the weight added to the bin. The bins may be mounted on weight scales and the increase in weight can be measured. If less than the entire package is added, the remaining amount in the package can be weighed on a separate scale and then compared with the added weight to the bin. This weight comparison effort can be incorporated in the automated operation cycle of the micro-ingredient delivery system whereby the compared weights can be recorded. In the event of an unacceptable variance, a remedial action can be taken to again confirm the identity of the added micro-ingredient. The controller can provide a recommended remedial action in the form of another user-interface message.

Various levels of user authorization can be provided to allow operators/supervisors to gain access to the bins of the micro-ingredient delivery system. The levels of authorization could be implemented in a user-password scheme in the master controller. For some micro-ingredients, it may be desirable to require a higher level of authorization to gain access to those bins. For example, for use of medications or other government-controlled ingredients, it may be advantageous to provide only selected access, such as by a supervisor.

The controller may also provide real-time inventory and ingredient data collection functions in accordance with the particular animal management system that is used. Feed batching data may be collected by the controller in an ingredient inventory function specified by the animal management system. The data captured from the bar code labels of the packages, such as the identity of the manufacturers and lot numbers can be recorded with respect to each corresponding batch of feed ration.

It is also contemplated that calculations can be made to provide a close approximation of when an ingredient lot number change has taken place between different batches of feed rations by analyzing feed dispensing data from the delivery system. Typically, the bins hold more of the micro-ingredients then are necessary to complete the next scheduled feed batch. Thus, as different feed batches are prepared, the particular lot numbers of the micro-ingredients delivered to the feed batches may be mixed between the batches. The calculations made can result in accurate estimations as to the lot numbers of each micro-ingredient found in each batch. These calculations thereby enhance reporting capabilities with respect to the lot numbers of micro-ingredients added to each batch.

Various other features and advantages of the present invention will become apparent by a review of the foregoing detailed description, taken in conjunction with the drawings.

DETAILED DESCRIPTION OF THE INVENTION

Figure 1:
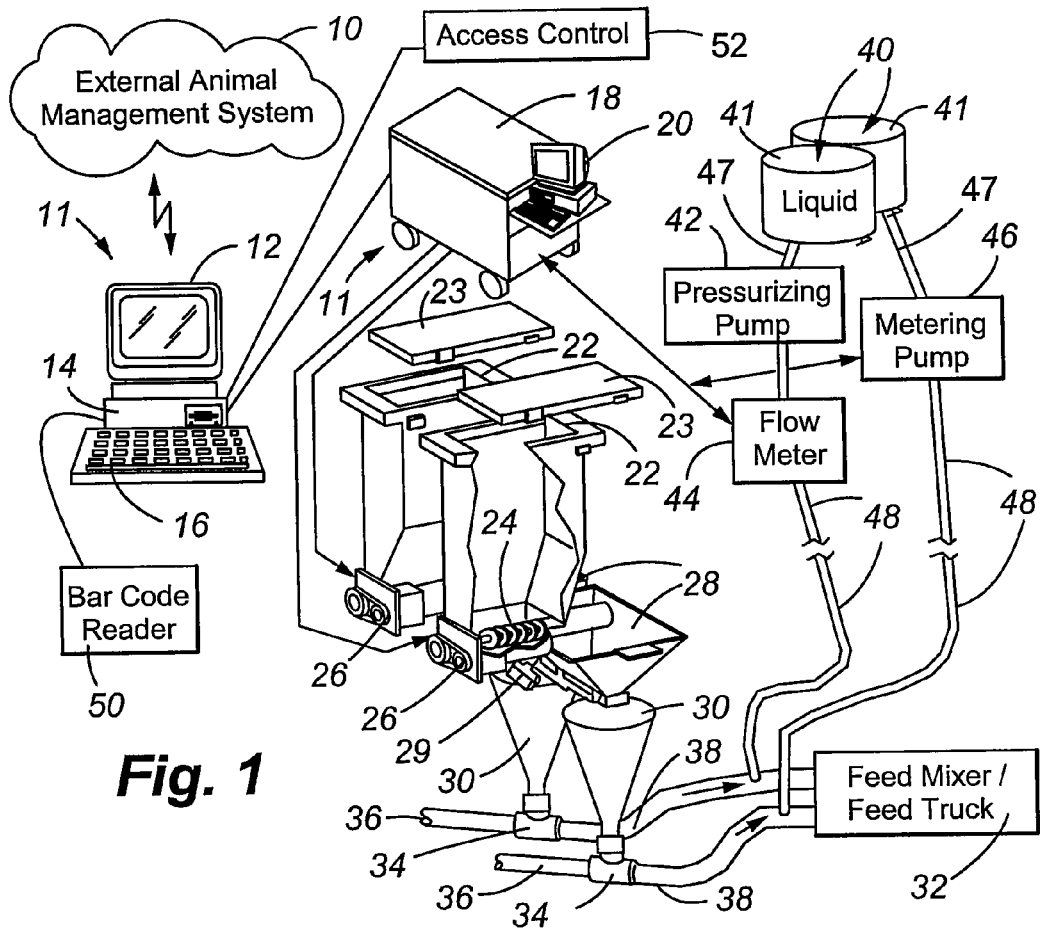
FIG. 1 is a schematic diagram illustrating the basic components of a micro-ingredient delivery system incorporating the controlled bin access of the present invention.

FIG. 1 illustrates one example of a micro-ingredient delivery system that can be used to store, dispense, and convey micro-ingredients to a feed mixer or feed truck. It shall be understood that the controlled bin access feature of the present invention can be used with any type of micro-ingredient delivery system wherein bins or containers are used to store the micro-ingredients prior to delivery to a feed ration. Accordingly, the particular types of equipment shown in FIG. 1 as well as the manner in which the equipment is used in the system are simply provided for an understanding of how one particular micro-ingredient delivery system can be arranged.

An external animal management system 10 communicates with a micro-ingredient delivery system master controller 11. The external animal management system specifies the types of rations that are to be prepared to include the particular micro-ingredients that should be added to designated feed rations. The information from the management system may be received electronically, as through a communications network such as a local area network, the Internet, or others. The master controller 11 may include both a computing devices such as a personal computer 14, and a PLC 18. The computing device 14 has a user interface/monitor 12 enabling a user to view functions of the micro-ingredient delivery system to include the amounts and types of micro-ingredients to be conveyed to the feed mixer, along with any other information that may be necessary for an operator to control the micro-ingredient delivery system. Typically, the master controller is user name/password protected for access to the automated delivery sequence operations. As one part of the overall computer software program for the delivery system, access is provided to the bins by user interfaces made available on the master controller. A conventional data input device 16, shown as a keyboard, is used to provide the operator with the ability to generate commands in order to control the system, to include functions associated with access control. Those skilled in the art can envision other data input devices to include mouses, touch screens, and others, it being understood that such input devices could also be placed at remote locations from the computing device in order to provide the most user-friendly control of the delivery system. The PLC 20 as shown may include its own user interface screen as necessary to best provide user control. In lieu of the use of a PLC, the personal computer may have an input/output card allowing the computer to send the appropriate signals to the various pieces of equipment in the system and to receive signals back from the equipment for processing.

The micro-ingredient delivery system typically includes a number of storage bins or bins that hold the micro-ingredients. In the example of FIG. 1, there are two storage bins 22 that are especially adapted for holding dry micro-ingredients, as well as two bins 40 that are especially adapted for holding liquid micro-ingredients. The storage bins 20 and 40 are illustrated as having corresponding removable covers or lids 23 and 41. The covers or lids are removed to gain access to the interior of the bins to add the micro-ingredients or to clean the interiors of the bins. The storage bins 22 may include a corresponding dispensing device such as an auger 24. Augers can accurately meter micro-ingredients held in the storage bins into respective hoppers 28, or directly into respective receiving tanks. A valve 29 may control the release of the micro-ingredients from the hoppers 28 into respective receiving tanks 30. The micro-ingredients are then conveyed by the downstream conveying lines 38 to the feed mixer/feed truck 32. Upstream lines 36 may be used to provide the motive force for transferring the micro-ingredients. For example, lines 36 may receive liquid to convey the micro-ingredients in a slurry form, or lines 36 can be pressurized from an air source (not shown) thereby causing the micro-ingredients to be conveyed pneumatically to the feed mixer/feed truck 32. The valves 34 control release of the micro-ingredients from the respective receiving tanks 30 into main delivery lines 38.

FIG. 1 also shows one manner in which liquid micro-ingredients may be conveyed to the feed mixer/feed truck 32. One liquid bin 40 has a dispense line 47 connected to a metering pump 46 that then meters the liquid micro-ingredient through intermediate line 48 and into the main delivery line 38. In an alternate method of dispensing, the other liquid bin 40 has a dispense line 47 connected to a pressurizing pump 42 which provides a pressurized flow of the liquid micro-ingredient through an inline flow meter 44 which then measures the amount of liquid delivered to intermediate line 48 and then into the main delivery line 38.

Those skilled in the art can envision other methods by which both the solid and the liquid micro-ingredients may be dispensed and conveyed to the feed mixer/feed truck, it being understood that the present invention is not strictly limited to any particular method.

A bar code reader device 50 communicates with the computing device 11 for scanning a bar code associated with each package of micro-ingredients. The bar code fields include data on the packaged micro-ingredient such as the type of micro-ingredient, the weight of the micro-ingredient in the package, the manufacturer, the manufacturer lot number, and any additional information that may be provided by the micro-ingredient manufacturer/distributor. The scanned information is transferred and stored in the computing device, and the data is used in providing the instructions to the PLC in executing an automated delivery sequence of selected micro-ingredients. Assuming the correct micro-ingredient has been scanned, this would enable the corresponding assigned bin 22/40 to be opened by placing the corresponding locking device 54 in an unlocked position.

Figure 2:
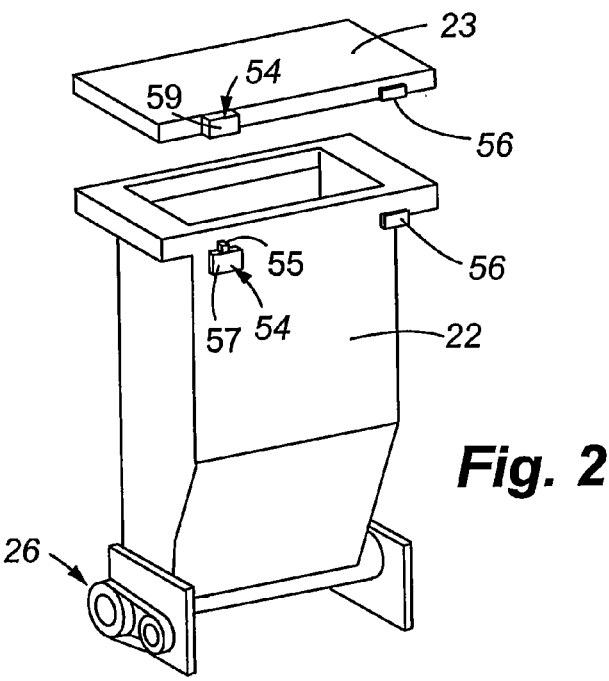
FIG. 2 is a perspective view of a micro-ingredient bin with access control features incorporated thereon, namely, a locking device and a switch.

The locking device 54 may include any number of commercially known locking devices that enable the cover or lids of the bins to be secured to the bin bodies. One example of a locking device that may be incorporated includes solenoid cabinet locks, such as those sold by Securitron Magnalock Corporation of Sparks, Nev. These types of cabinet locks include a lock body that mounts on the fixed body of the bin, and a keeper that mounts on the cover or lid. A solenoid controlled locking element 55 is actuated to lock or unlock the lock body to the keeper. As best seen in FIG. 2, such a cabinet lock is illustrated having two components. The first component or lock body 57 is mounted to the bin and includes the actuatable locking element 55, and the other component or keeper 59 is mounted to the cover 23. FIG. 2 also illustrates a contact switch 56 that provides an input to the PLC to indicate whether the lid has been removed or is secured to the body of the bin.

FIG. 1 also illustrates an access control device 52 that communicates with both the PLC and the personal computer. This access control device 52 is provided to allow a user, such as maintenance personnel, to obtain access to the bins without having to gain access to the delivery system through the master controller 11. This access control device allows a user to lock and unlock any of the locking devices in the micro-ingredient delivery system. Use of this separate access control element may be desirable to provide access by maintenance personnel during non-operational hours of the micro-ingredient delivery system, or at other times when access is required to the bin, but the operator/supervisor is not available to grant access. Thus, the access control device 52 simply allows a separate access to the bins for the purposes of conducting maintenance, repair or other actions that may need to take place with respect to micro-ingredients within the bins or the associated bins themselves. Various types of access control systems may be employed, such as card readers, RFID readers, as well as biometric identity verification systems. The access control device verifies the identity of the person desiring to gain access to the bins, and if proper identification is provided, the access control device sends a signal to the PLC and/or personal computer requesting that one or more selected bin locks be opened or closed. Accordingly, an output signal is generated by the PLC to open or close the selected lock(s). The electronic link with the personal computer allows reports to be generated for information such as when the remote access device was activated, which bin locks were opened and closed, which covers were opened or closed, and the identity of the requestor.

Figure 3:
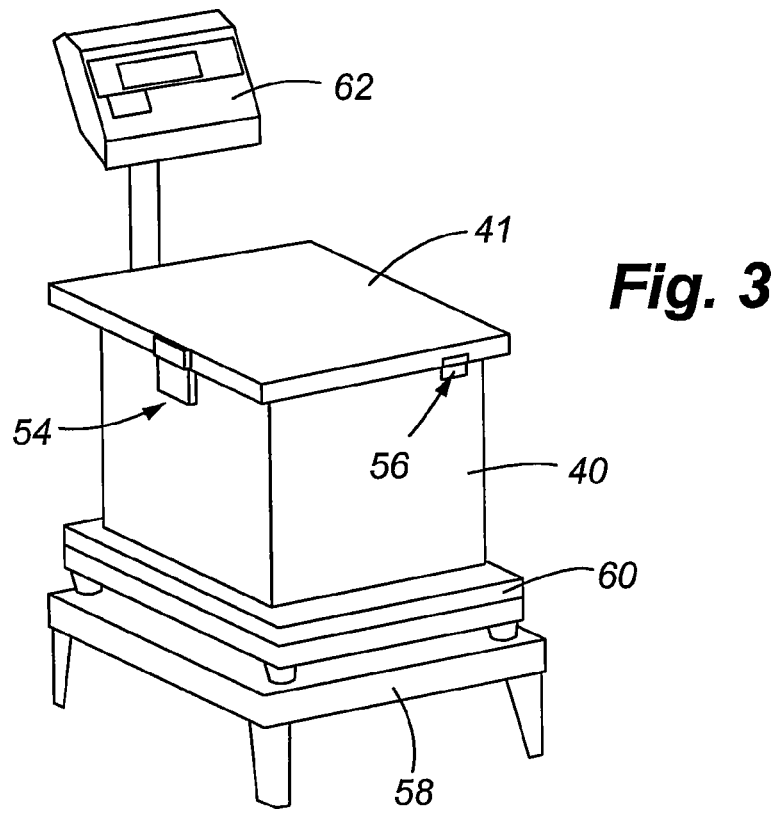
FIG. 3 illustrates another type of bin used to store micro-ingredients to include the control access features of the present invention.

FIG. 3 illustrates a liquid micro-ingredient bin 40, as well as a locking device 54 and contact switch 56 both mounted to the bin. FIG. 3 also illustrates the liquid micro-ingredient bin 40 sitting on a scale 60 and the scale resting on a support 58. A scale display 62 extends from the base of the scale 60. Thus with respect to FIG. 3, delivery of the liquid micro-ingredients in bin 40 can be measured by loss in weight, a method that is well known in the art. The locking devices 54 and switches 56 of the liquid bins operate in the same manner as described with respect to use of those elements on the dry micro-ingredient bins 22.

Figure 4:
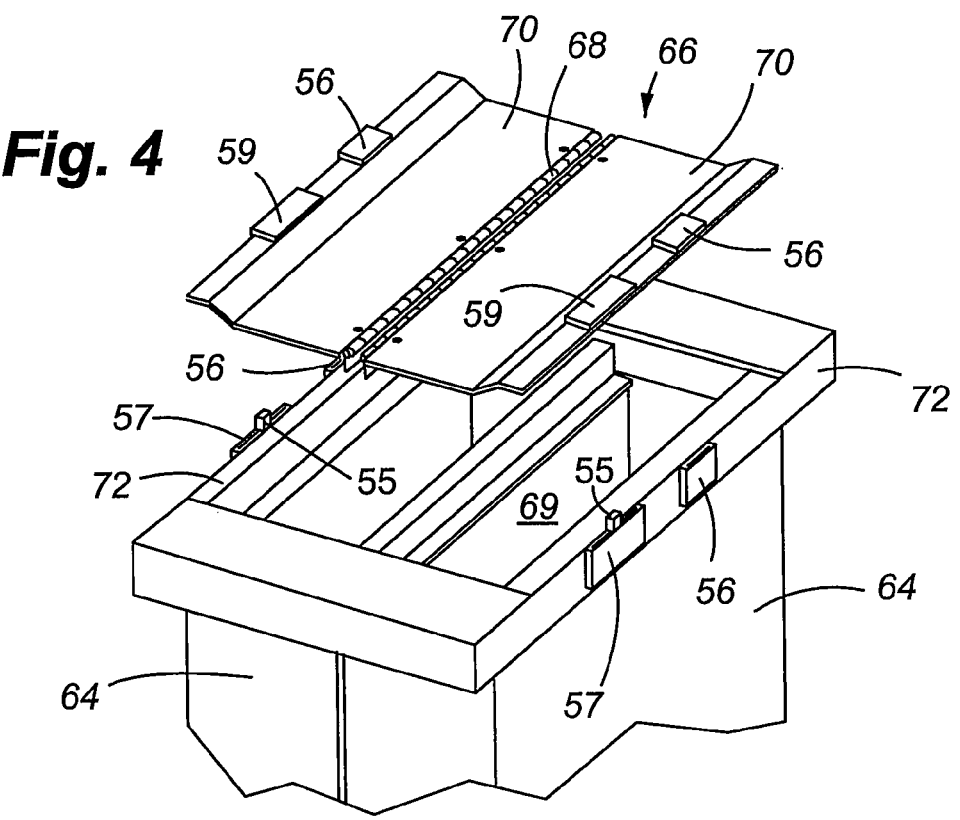
FIG. 4 illustrates another type of bin that may be used to store micro-ingredients therein and illustrating how the controlled access features of the present invention may be incorporated thereon.

FIG. 4 illustrates another type of micro-ingredient bin arrangement that may be used for storage of dry micro-ingredients. As shown, a pair of side-by-side bins 64 includes a common a lid 66 with a center hinge 68 that interconnects opposing panels 70. Each of the panels 70 covers the respective openings of the side-by-side bins 64. Locking devices 54 are mounted to both panels 70, as well as contact switches 56 also being incorporated on both panels 70. Depending upon the feed ration to be prepared, the bins 64 may hold the same or different micro-ingredients therein. The center hinge 68 of the cover is secured to a divider 69 that separates the bins. An upper housing flange 72 allows convenient mounting of the first parts of the locking devices and switches, while the second parts of the locking devices and switches are mounted on the upper surface of the panel 70.

Although FIGS. 2-4 show specific types of bin/bins for holding micro-ingredients, it shall be understood that any number of different types of bins may be suitable for incorporation of locking devices that restrict access to the bins. Thus, the particular shape and size of the bins and covers as disclosed herein are not to be construed as the only ones capable of having integral locking devices and switches.

By the controlled bin access of the present invention, some problems can be eliminated or greatly reduced with respect to the delivery of the correct micro-ingredients to a feed ration. Controlled bin access in accordance with the present invention prevents any reasonable likelihood that the wrong micro-ingredient will be added to a bin. Thus, cross-contamination between micro-ingredients added to a feed ration can also be greatly reduced. Overall system security is improved by providing restricted access to the bins. By use of the bar scanning device enabling direct transfer of data regarding micro-ingredients added to the bins, more accurate inventory control can be achieved which, in turn, allows more accurate reporting capabilities. Clearly, lot number tracking is made easier by entry of the lot number information directly from the bar codes, and calculations made regarding the dispensing of the micro-ingredients from the bins allows accurate estimation as to lot numbers for each feed ration batch. Because information can be recorded with respect to when the bins are opened and closed, this information can be used to determine if there were any unauthorized actions taken to access the bins, it being presumed that all access actions can be recorded as to their purpose, such as charging a bin or performing maintenance on the bin. Data indicating that the bins were accessed at odd times or not during scheduled maintenance times may provide a warning that some unauthorized access has been made to the bins.

In accordance with the method of the present invention, batch ingredient requirements are first established, such as those requirements that may be directed by the external animal management system. In other words, batch orders may be received from the management system directing the type of feed rations to be prepared to include the mix of micro-ingredients to be added to the bulk ingredients at the feed mixer/feed truck. The various bins available in the micro-ingredient delivery system must then be designated to hold assigned micro-ingredients based on the batch orders from the management system. Minimum bin loading requirements must also be established for each bin to hold an amount of the designated micro-ingredient to satisfy the batch orders for the day or other designated time period. Access conditions are also established to define when and under what circumstances the bins can be accessed. For example, as discussed above, there may be times when the bins should be made available for maintenance while at other times, no access to the bins should be granted, except for perhaps supervisor/administrator level access. As also discussed above, access to the bins would be denied if the wrong micro-ingredient package was scanned in an attempt to charge a particular bin with that micro-ingredient. Access security levels must also be established in order to grant access to authorized individuals. As also discussed above, the access control device can be used for access to the bins for maintenance personnel or others who have a need to access during times in which the micro-delivery system is not operating and no operators/supervisors are available for granting access. After achieving the foregoing steps, micro-ingredient delivery system operations can take place where the bin locks are opened or closed in accordance with commands generated from the master controller and/or the access control device. Various user interfaces can be provided, such as user interface screens, printed reports, or audible or visual warning devices in order to convey the access statuses of the bins.

The foregoing discussion of the invention has been presented for purposes of illustration and description. Further, the description is not intended to limit the invention to the forms disclosed herein. Consequently, variations and modifications commensurate with the above teachings, within the skill and knowledge of the relevant art are within the scope of the present invention. The embodiments described herein are further intended to explain the best mode presently known of practicing the invention and to enable others skilled in the art to utilize the invention and other various modifications required by their particular application or use of the invention. Thus, it is intended that the claims be construed to include the alternative embodiments to the extent permitted by the prior art.

What is claimed is:

1. A method of controlling access to bins used in a micro-ingredient delivery and mixer system, said method comprising the steps of:

providing a bin for housing micro-ingredients therein, said bin comprising an opening for receiving the micro-ingredients, and a cover removably placed over said opening;

providing a locking device integrated with said bin for locking said cover with respect to said opening of said bin;

providing a controller communicating with said locking device; providing the micro-ingredients to be placed in the bin; scanning a barcode incorporated on packaging containing at least one of said micro-ingredients, said barcode providing data that identifies the micro-ingredient;

recording information from said barcode in said controller; determining whether said barcode information entered matches an authorized ingredient to be placed in said bin;

actuating said locking device by said controller based upon the barcode data, wherein if a micro-ingredient is authorized for said bin, said locking device is opened, and if said, micro-ingredient is not authorized, said locking device remains in a locked position; and selectively mixing the micro-ingredients in a mixer prior to delivery of the micro-ingredients to a feed ration.

2. A method, as claimed in claim 1, wherein:
said bin further includes a contact switch communicating with said controller indicating whether said bin is opened or closed.

3. A method, as claimed in claim 1, further comprising the steps of:

recording data regarding an authorized micro-ingredient added to said bin, said data including an amount and type of the micro-ingredient, lot number, and time and date when said micro-ingredient was added to the bin.

4. A method of controlling access to bins used in a micro-ingredient delivery and mixer system, said method comprising the steps of:

providing a bin for housing at least two micro-ingredients therein, said bin comprising an opening for receiving the micro-ingredients, and a cover removably placed over said opening;

providing a locking device integrated with said bin for locking said cover with respect to said opening of said bin;

providing a controller communicating with said locking device; providing ingredient the micro-ingredients to be placed in the bin;

determining access conditions defining the conditions under which the access can be granted to opening the cover of the at least one bin; and actuating said locking device by said controller based upon the access conditions, wherein if a micro-ingredient is authorized to be loaded in said bin according to said access conditions, said locking device is opened, and if said micro-ingredient is not authorized, said locking device remains in a locked position; and loading the least two micro-ingredients in said bin and mixing the micro-ingredients prior to delivering the micro-ingredients to a feed ration.

5. A method, as claimed in claim 4, further including the steps of:

scanning a barcode incorporated on packaging containing at least one of said micro-ingredients, said barcode providing data that identifies a corresponding micro-ingredient;

recording information from said barcode in said controller;

determining whether said barcode information entered matches a micro-ingredient authorized to be placed in said bin;

actuating said locking device by said controller based upon the barcode data, wherein if said micro-ingredient is authorized for said bin, said locking device is opened, and if said micro-ingredient is not authorized, said locking device remains in a locked position.

6. A method of controlling access to bins used in a micro-ingredient delivery and mixer system, said method comprising:

recording data regarding authorized micro-ingredients to be added to an animal feed ration;

providing a container for housing micro-ingredients used in the feed rations, said container having an opening to receive the micro-ingredients and a cover for securing the container;

providing a locking device for locking said cover with respect to the opening of the container;

providing a controller communicating with the locking device, and for determining identification of authorized ingredients to be added into the container;

inputting data to the controller that identifies micro-ingredients to be added to the container;

determining whether the data regarding micro-ingredients to be added matches authorized ingredients wherein if the ingredient is authorized, the locking device is opened, and if the ingredient is not authorized, the locking device remains locked; and loading at least two authorized micro-ingredients into the container, and mixing the micro-ingredients in a mixer prior to delivering the micro-ingredients to a feed ration.

7. A method, as claimed in claim 6, wherein:

said container further includes a switch communicating with the controller indicating whether the container is opened or closed.

8. A method, as claimed in claim 6, further comprising:

recording data regarding micro-ingredients added to the container including amounts and types of micro-ingredients, lot numbers, and time and dates from when the micro-ingredients were added to the container.

9. A method, as claimed in claim 6, wherein:

said information is entered into the controller by a bar code reader which reads a bar code on packaging of the micro-ingredients.

10. A method, as claimed in claim 6, wherein:

said controller comprises a personal computer having an input/output card.

* * * * *

UNITED STATES PATENT AND TRADEMARK OFFICE
CERTIFICATE OF CORRECTION

| | | |
|---|---|---|
| PATENT NO. | : 7,972,055 B2 | |
| APPLICATION NO. | : 12/566537 | |
| DATED | : July 5, 2011 | |
| INVENTOR(S) | : John E. Adent and Steve R. Freeman | |

It is certified that error appears in the above-identified patent and that said Letters Patent is hereby corrected as shown below:

At Column 10, line 28 of claim 4, please delete the word "ingredient".

Signed and Sealed this
Thirtieth Day of August, 2011

David J. Kappos
*Director of the United States Patent and Trademark Office*